United States Patent
Yanagawa et al.

(10) Patent No.: US 8,846,995 B2
(45) Date of Patent: Sep. 30, 2014

(54) METHOD FOR PRODUCING MONOCYCLIC AROMATIC HYDROCARBONS

(75) Inventors: Shinichiro Yanagawa, Tokyo (JP); Masahide Kobayashi, Tokyo (JP)

(73) Assignee: JX Nippon Oil & Energy Corporation, Tokyo (JP)

(*) Notice: Subject to any disclaimer, the term of this patent is extended or adjusted under 35 U.S.C. 154(b) by 81 days.

(21) Appl. No.: 13/634,118

(22) PCT Filed: Mar. 25, 2011

(86) PCT No.: PCT/JP2011/057299
§ 371 (c)(1),
(2), (4) Date: Sep. 11, 2012

(87) PCT Pub. No.: WO2011/118753
PCT Pub. Date: Sep. 29, 2011

(65) Prior Publication Data
US 2013/0006027 A1     Jan. 3, 2013

(30) Foreign Application Priority Data
Mar. 26, 2010 (JP) .................. 2010-071743

(51) Int. Cl.
*C10G 55/00* (2006.01)
(52) U.S. Cl.
USPC ............................... 585/319; 208/66; 208/67
(58) Field of Classification Search
CPC ............. C10G 55/00; C10G 2300/301; C10G 2300/4081; C10G 2400/30
USPC ....................... 585/319; 208/66, 67
See application file for complete search history.

(56) References Cited

U.S. PATENT DOCUMENTS

| | | | |
|---|---|---|---|
| 2,769,753 | A | 11/1956 | Hutchings et al. |
| 3,806,443 | A | 4/1974 | Maziuk |
| 4,053,388 | A | 10/1977 | Bailey |
| 5,143,596 | A | 9/1992 | Maxwell et al. |
| 2010/0016645 | A1 | 1/2010 | Cosyns et al. |

FOREIGN PATENT DOCUMENTS

| | | |
|---|---|---|
| CN | 101376823 | 3/2009 |
| CN | 101570698 | 11/2009 |
| JP | 49-041323 | 4/1974 |
| JP | 53-116328 | 10/1978 |
| JP | 03-002128 | 1/1991 |

(Continued)

OTHER PUBLICATIONS

International Search Report dated May 10, 2011 issued in corresponding PCT Application No. PCT/JP2011/057299.

(Continued)

*Primary Examiner* — Thuan D Dang
(74) *Attorney, Agent, or Firm* — Kenyon & Kenyon LLP (57) ABSTRACT

A method for producing monocyclic aromatic hydrocarbons of 6 to 8 carbon number from a feedstock oil having a 10 volume % distillation temperature of at least 140° C. and a 90 volume % distillation temperature of not more than 380° C., the method including: a cracking and reforming reaction step of obtaining a product containing monocyclic aromatic hydrocarbons of 6 to 8 carbon number from the feedstock oil, a refining and collection step of refining and collecting monocyclic aromatic hydrocarbons of 6 to 8 carbon number that have been separated from the product, a hydrogenation reaction step of hydrogenating a heavy fraction of 9 or more carbon number separated from the product, and a recycling step of returning the heavy fraction hydrogenation reaction product obtained in the hydrogenation reaction step to the cracking and reforming reaction step.

11 Claims, 3 Drawing Sheets

(56) References Cited

FOREIGN PATENT DOCUMENTS

| JP | 03-026791 | 2/1991 |
|----|-----------|--------|
| JP | 03-052993 | 3/1991 |
| JP | 03-177496 | 8/1991 |
| JP | 4-504577 | 8/1992 |
| JP | 2007-154151 | 6/2007 |
| JP | 2009-235247 | 10/2009 |
| JP | 2009-235248 | 10/2009 |
| WO | 91/08998 | 6/1991 |

OTHER PUBLICATIONS

Chikanori Nakaoka et al., "Development of BTX production technology from heavier fractions by selective hydrocracking", The Aromatics, 2009, vol. 61, Kaki-go, pp. 221 to 225.

Office Action dated Dec. 30, 2013 issued in corresponding CN Application No. 201180016142.1 [With English Translation of Search Report].

Search Report dated Apr. 9, 2014 issued in corresponding European Application No. 11759557.9.

FIG. 1

FIG. 3 ns of 6 to 8 carbon number cannot be claimed to be entirely satisfactory.

METHOD FOR PRODUCING MONOCYCLIC AROMATIC HYDROCARBONS

TECHNICAL FIELD

The present invention relates to a method for producing monocyclic aromatic hydrocarbons that enables the production of monocyclic aromatic hydrocarbons from oils containing a large amount of polycyclic aromatic hydrocarbons.

This application is a national stage application of International Application No. PCT/JP2011/057299, filed Mar. 25, 2011, which claims priority to Japanese Patent Application No. 2010-071743, filed Mar. 26, 2010, the content of which is incorporated herein by reference.

BACKGROUND ART

Light cycle oil (hereinafter also referred to as "LCO"), which is a cracked light oil produced in a fluid catalytic cracker, contains a large amount of polycyclic aromatic hydrocarbons, and has been used as a light oil or a heavy oil. However, in recent years, investigations have been conducted into the possibilities of obtaining, from LCO, monocyclic aromatic hydrocarbons (such as benzene, toluene, xylene and ethylbenzene), which can be used as high-octane gasoline base stocks or petrochemical feedstocks, and offer significant added value.

For example, Patent Documents 1 to 3 propose methods that use zeolite catalysts to produce monocyclic aromatic hydrocarbons from the polycyclic aromatic hydrocarbons contained in large amounts within LCO and the like.

CITATION LIST

Patent Documents

[Patent Document 1]
Japanese Unexamined Patent Application, First Publication No. H 3-2128
[Patent Document 2]
Japanese Unexamined Patent Application, First Publication No. H 3-52993
[Patent Document 3]
Japanese Unexamined Patent Application, First Publication No. H 3-26791

DISCLOSURE OF INVENTION

Technical Problem

However, in the methods discloses in Patent Documents 1 to 3, the yield of monocyclic aromatic hydrocarbons of 6 to 8 carbon number cannot be claimed to be entirely satisfactory.

The present invention has an object of providing a method for producing monocyclic aromatic hydrocarbons that enables the production of monocyclic aromatic hydrocarbons of 6 to 8 carbon number in a high yield from a feedstock oil containing polycyclic aromatic hydrocarbons.

Solution to Problem

[1] A method for producing monocyclic aromatic hydrocarbons of 6 to 8 carbon number from a feedstock oil having a 10 volume % distillation temperature of at least 140° C. and a 90 volume % distillation temperature of not more than 380° C., the method including:

a cracking and reforming reaction step of bringing the feedstock oil into contact with a monocyclic aromatic hydrocarbon production catalyst containing a crystalline aluminosilicate, and reacting the feedstock oil to obtain a product containing monocyclic aromatic hydrocarbons of 6 to 8 carbon number, a refining and collection step of refining and collecting monocyclic aromatic hydrocarbons of 6 to 8 carbon number that have been separated from the product obtained in the cracking and reforming reaction step, a hydrogenation reaction step of hydrogenating a heavy fraction of 9 or more carbon number separated from the product obtained in the cracking and reforming reaction step, and a recycling step of returning the heavy fraction hydrogenation reaction product obtained in the hydrogenation reaction step to the cracking and reforming reaction step.

[2] The method for producing monocyclic aromatic hydrocarbons of 6 to 8 carbon number according to [1], further including a feedstock oil mixing step of mixing a portion of the feedstock oil with the heavy fraction of 9 or more carbon number separated from the product obtained in the cracking and reforming reaction step.

[3] A method for producing monocyclic aromatic hydrocarbons of 6 to 8 carbon number from a feedstock oil having a 10 volume % distillation temperature of at least 140° C. and a 90 volume % distillation temperature of not more than 380° C., the method including:

a cracking and reforming reaction step of bringing the feedstock oil into contact with a monocyclic aromatic hydrocarbon production catalyst containing a crystalline aluminosilicate, and reacting the feedstock oil to obtain a product containing monocyclic aromatic hydrocarbons of 6 to 8 carbon number, a hydrogenation reaction step of hydrogenating a portion of the product obtained in the cracking and reforming reaction step, a refining and collection step of refining and collecting monocyclic aromatic hydrocarbons of 6 to 8 carbon number by distilling the hydrogenation reaction product obtained in the hydrogenation reaction step, and a recycling step of returning a heavy fraction of 9 or more carbon number, which has been separated and removed from the monocyclic aromatic hydrocarbons of 6 to 8 carbon number in the refining and collection step, to the cracking and reforming reaction step.

[4] The method for producing monocyclic aromatic hydrocarbons of 6 to 8 carbon number according to [3], further including a feedstock oil mixing step of mixing a portion of the feedstock oil with a portion of the product obtained in the cracking and reforming reaction step.

[5] A method for producing monocyclic aromatic hydrocarbons of 6 to 8 carbon number from a feedstock oil having a 10 volume % distillation temperature of at least 140° C. and a 90 volume % distillation temperature of not more than 380° C., the method including:

a hydrogenation reaction step of hydrogenating the feedstock oil, a cracking and reforming reaction step of bringing the hydrogenated product obtained in the hydrogenation reaction step into contact with a monocyclic aromatic hydrocarbon production catalyst containing a crystalline aluminosilicate, and reacting the hydrogenated product to obtain a product containing monocyclic aromatic hydrocarbons of 6 to 8 carbon number, a refining and collection step of refining and collecting monocyclic aromatic hydrocarbons of 6 to 8 carbon number that have been separated from the product obtained in the cracking and reforming reaction step, and a recycling step of returning a heavy fraction of 9 or more carbon number separated from the product obtained in the cracking and reforming reaction step to the hydrogenation reaction step.

[6] The method for producing monocyclic aromatic hydrocarbons of 6 to 8 carbon number according to any one of [1] to [5], wherein the crystalline aluminosilicate contained within the monocyclic aromatic hydrocarbon production catalyst used in the cracking and reforming reaction step contains a medium pore size zeolite and/or a large pore size zeolite as a main component.

[7] The method for producing monocyclic aromatic hydrocarbons of 6 to 8 carbon number according to any one of [1] to [6], further including a hydrogen recovery step of recovering, from the product obtained in the cracking and reforming reaction step, the hydrogen that is produced as a byproduct in the cracking and reforming reaction step, and a hydrogen supply step of supplying the hydrogen recovered in the hydrogen recovery step to the hydrogenation reaction step.

Advantageous Effects of Invention

The monocyclic aromatic hydrocarbon production catalyst and the method for producing monocyclic aromatic hydrocarbons of 6 to 8 carbon number according to the present invention enable the production of monocyclic aromatic hydrocarbons of 6 to 8 carbon number in a high yield from a feedstock oil containing polycyclic aromatic hydrocarbons.

BEST MODE FOR CARRYING OUT THE INVENTION

First Embodiment

A first embodiment of the method for producing monocyclic aromatic hydrocarbons according to the present invention is described below.

Figure 1:
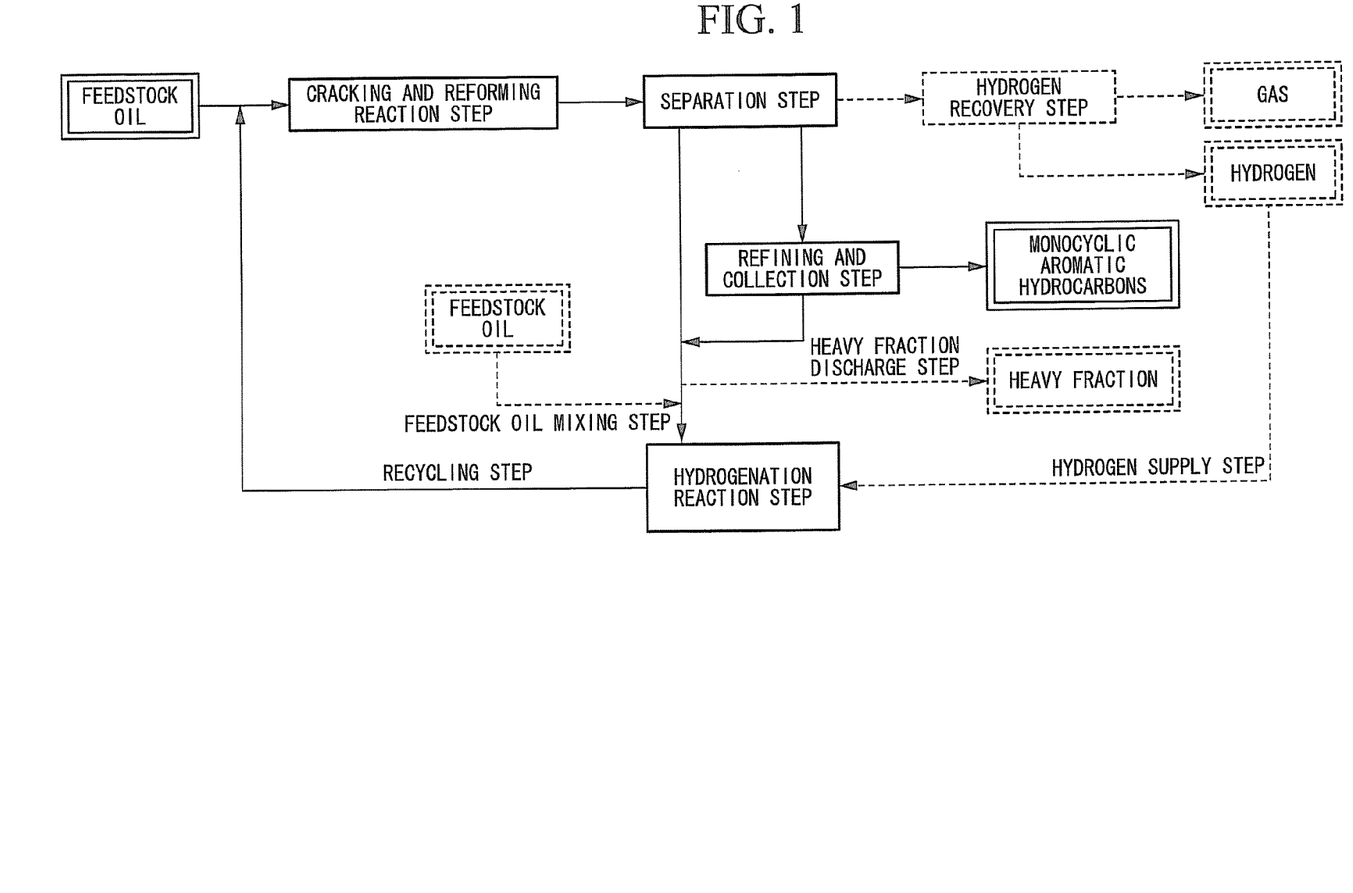
FIG. 1 is a diagram describing a first embodiment of the method for producing monocyclic aromatic hydrocarbons according to the present invention.

The method for producing monocyclic aromatic hydrocarbons according to this embodiment is a method for producing monocyclic aromatic hydrocarbons of 6 to 8 carbon number (hereinafter referred to as simply "monocyclic aromatic hydrocarbons") from a feedstock oil that represents an embodiment of aspect [1] of the present invention, and includes the steps (a) to (i) described below (see FIG. 1).

(a) A cracking and reforming reaction step of bringing a feedstock oil into contact with a monocyclic aromatic hydrocarbon production catalyst, and reacting the feedstock oil to obtain a product containing monocyclic aromatic hydrocarbons.

(b) A separation step of separating the product obtained in the cracking and reforming reaction step into a plurality of fractions.

(c) A refining and collection step of refining and collecting the monocyclic aromatic hydrocarbons separated in the separation step.

(d) A heavy fraction discharge step of discharging outside the system a portion of the heavy fraction of 9 or more carbon number (hereinafter referred to as simply the "heavy fraction") obtained from a fraction separated in the separation step.

(e) A feedstock oil mixing step of mixing a portion of the feedstock oil with the heavy fraction that was not discharged outside the system in the heavy fraction discharge step.

(f) A hydrogenation reaction step of hydrogenating the heavy fraction that was not discharged outside the system in the heavy fraction discharge step, or the mixed oil obtained by mixing the heavy fraction with a portion of the feedstock oil.

(g) A hydrogen recovery step of recovering, from the gas component separated in the separation step, the hydrogen produced as a byproduct in the cracking and reforming reaction step.

(h) A hydrogen supply step of supplying the hydrogen recovered in the hydrogen recovery step to the hydrogenation reaction step.

(i) A recycling step of returning a heavy fraction hydrogenation reaction product obtained in the hydrogenation reaction step to the cracking and reforming reaction step.

Of the steps (a) to (i) described above, the steps (a), (c), (f) and (i) are essential steps in the method according to the first embodiment, whereas the steps (b), (d), (e), (g) and (h) are optional steps.

Each of the above steps is described below in further detail.

<Cracking and Reforming Reaction Step>

The feedstock oil contains polycyclic aromatic hydrocarbons and saturated hydrocarbons.

In the cracking and reforming reaction step, the feedstock oil is brought into contact with the monocyclic aromatic hydrocarbon production catalyst, and with the saturated hydrocarbons contained within the feedstock oil functioning as hydrogen donor sources, a hydrogen transfer reaction from the saturated hydrocarbons is used to partially hydrogenate the polycyclic aromatic hydrocarbons, thereby effecting ring-opening and converting the polycyclic aromatic hydrocarbons into monocyclic aromatic hydrocarbons. Further, monocyclic aromatic hydrocarbons are also formed by cyclization and dehydrogenation of saturated hydrocarbons, which either exist within the feedstock oil or are formed by a cracking process. Moreover, monocyclic aromatic hydrocarbons of 6 to 8 carbon number can also be obtained by cracking of monocyclic aromatic hydrocarbons of 9 or more carbon number. In addition to the monocyclic aromatic hydrocarbons, the product of the cracking and reforming reaction also includes hydrogen, methane, LPG and a heavy fraction of 9 or more carbon number and the like.

(Feedstock Oil)

The feedstock oil used in the present invention is an oil having a 10 volume % distillation temperature of at least 140° C. and a 90 volume % distillation temperature of not more than 380° C. With an oil having a 10 volume % distillation temperature of less than 140° C., the reaction involves production of monocyclic aromatic hydrocarbons from light compounds, which is outside the scope of the present invention. Further, if an oil having a 90 volume % distillation temperature that exceeds 380° C. is used, then the yield of monocyclic aromatic hydrocarbons tends to decrease, and the amount of coke deposition on the monocyclic aromatic hydrocarbon production catalyst tends to increase, causing a more rapid deterioration in the catalytic activity.

The 10 volume % distillation temperature of the feedstock oil is preferably 150° C. or higher, and the 90 volume % distillation temperature of the feedstock oil is preferably not more than 360° C.

In this description, the 10 volume % distillation temperature and the 90 volume % distillation temperature refer to values measured in accordance with the methods prescribed in JIS K 2254 "Petroleum products—determination of distillation characteristics".

Examples of feedstock oils having a 10 volume % distillation temperature of at least 140° C. and a 90 volume % distillation temperature of not more than 380° C. include cracked light oils (LCO) produced in a fluid catalytic cracker, hydrotreated LCO, coal liquefaction oil, hydrocracked oil from heavy oils, straight-run kerosene, straight-run gas oil, coker kerosene, coker gas oil, and hydrocracked oil from oil sands.

Polycyclic aromatic hydrocarbons exhibit low reactivity and are difficult to convert to monocyclic aromatic hydrocarbons in the cracking and reforming reaction step of the present invention. However, these polycyclic aromatic hydrocarbons are hydrogenated in the hydrogenation reaction step and converted to naphthenobenzenes, and if these naphthenobenzenes are then recycled and re-supplied to the cracking and reforming reaction step, they can be converted to monocyclic aromatic hydrocarbons. Accordingly, there are no particular limitations in terms of the feedstock oil containing a large amount of polycyclic aromatic hydrocarbons. However, among polycyclic aromatic hydrocarbons, tricyclic and higher aromatic hydrocarbons consume a large amount of hydrogen in the hydrogenation reaction step, and suffer from poor reactivity in the cracking and reforming reaction step even in the form of a hydrogenation reaction product, and therefore the feedstock oil preferably does not contain a large amount of such tricyclic and higher aromatic hydrocarbons. Accordingly, the amount of tricyclic and higher aromatic hydrocarbons within the feedstock oil is preferably not more than 25 volume %, and more preferably 15 volume % or less.

Examples of particularly desirable feedstock oils which contain bicyclic aromatic hydrocarbons that can be readily converted to naphthenobenzenes in the hydrogenation reaction step, but in which the amount of tricyclic or higher aromatic hydrocarbons is reduced, include feedstock oils having a 90 volume % distillation temperature of not more than 330° C.

In this description, the polycyclic aromatic fraction describes the combined total of the amount of bicyclic aromatic hydrocarbons (the bicyclic aromatic fraction) and the amount of tricyclic and higher aromatic hydrocarbons (the tricyclic and higher aromatic fraction), which is either measured in accordance with JPI-5S-49 "Petroleum Products—Determination of Hydrocarbon Types—High Performance Liquid Chromatography", or determined by analysis using FID gas chromatography or two-dimensional gas chromatography. In the following description, an amount of polycyclic aromatic hydrocarbons, bicyclic aromatic hydrocarbons or tricyclic or higher aromatic hydrocarbons reported using the units "volume %" represents an amount that has been measured in accordance with JPI-5S-49, whereas an amount that is reported using the units "% by mass" represents an amount that has been measured on the basis of FID gas chromatography or two-dimensional gas chromatography.

(Reaction Format)

Examples of the reaction format used for bringing the feedstock oil into contact with the monocyclic aromatic hydrocarbon production catalyst include fixed beds, moving beds and fluidized beds. In the present invention, because a heavy oil fraction is used as the feedstock, a fluidized bed is preferred as it enables the coke fraction adhered to the catalyst to be removed in a continuous manner and enables the reaction to proceed in a stable manner. A continuous regeneration-type fluidized bed, in which the catalyst is circulated between the reactor and a regenerator, thereby continuously repeating a reaction-regeneration cycle, is particularly desirable. The feedstock oil is preferably in a gaseous state when it makes contact with the monocyclic aromatic hydrocarbon production catalyst. Further, the feedstock may be diluted with a gas if required.

(Monocyclic Aromatic Hydrocarbon Production Catalyst)

The monocyclic aromatic hydrocarbon production catalyst contains a crystalline aluminosilicate.

[Crystalline Aluminosilicate]

The crystalline aluminosilicate is preferably a medium pore size zeolite and/or a large pore size zeolite, as these materials enable the yield of the monocyclic aromatic hydrocarbons to be further increased.

Medium pore size zeolites are zeolites having a 10-membered ring basic structure, and examples of these medium pore size zeolites include zeolites having AEL, EUO, FER, HEU, MEL, MFI, NES, TON and WEI type crystal structures. Among these, MFI-type zeolites are preferred as they enable a greater increase in the yield of monocyclic aromatic hydrocarbons.

Large pore size zeolites are zeolites having a 12-membered ring basic structure, and examples of these large pore size zeolites include zeolites having AFI, MO, BEA, CON, FAU, GME, LTL, MOR, MTW and OFF type crystal structures. Among these, BEA, FAU and MOR type zeolites are preferred in terms of industrial usability, and BEA-type zeolites are particularly desirable as they enable a greater increase in the yield of monocyclic aromatic hydrocarbons.

Besides the above medium pore size zeolites and large pore size zeolites, the crystalline aluminosilicate may also contain small pore size zeolites having a 10-membered ring or smaller basic structure, and extra large pore size zeolites having a 14-membered ring or larger basic structure.

Examples of the small pore size zeolites include zeolites having ANA, CHA, ERI, GIS, KFI, LTA, NAT, PAU and YUG type crystal structures.

Examples of the extra large pore size zeolites include zeolites having CLO and VPI type crystal structures.

In those cases where the cracking and reforming reaction step is conducted as a fixed bed reaction, the amount of the crystalline aluminosilicate within the monocyclic aromatic hydrocarbon production catalyst, relative to a value of 100% by mass for the entire catalyst, is preferably within a range from 60 to 100% by mass, more preferably from 70 to 100% by mass, and still more preferably from 90 to 100% by mass. Provided the amount of the crystalline aluminosilicate is at least 60% by mass, the yield of monocyclic aromatic hydrocarbons can be increased satisfactorily.

In those cases where the cracking and reforming reaction step is conducted as a fluidized bed reaction, the amount of the crystalline aluminosilicate within the monocyclic aromatic hydrocarbon production catalyst, relative to a value of 100% by mass for the entire catalyst, is preferably within a range from 20 to 60% by mass, more preferably from 30 to 60% by mass, and still more preferably from 35 to 60% by mass. Provided the amount of the crystalline aluminosilicate is at least 20% by mass, the yield of monocyclic aromatic hydrocarbons can be increased satisfactorily. However, if the amount of the crystalline aluminosilicate exceeds 60% by mass, then the amount of binder that can be included in the catalyst decreases, and the resulting catalyst may be unsuitable for a fluidized bed.

[Phosphorus, Boron]

The monocyclic aromatic hydrocarbon production catalyst preferably also includes phosphorus and/or boron. If the monocyclic aromatic hydrocarbon production catalyst includes phosphorus and/or boron, then a deterioration over time in the yield of monocyclic aromatic hydrocarbons can be prevented, and coke production on the catalyst surface can be inhibited.

Examples of methods for incorporating phosphorus within the monocyclic aromatic hydrocarbon production catalyst include ion-exchange methods and impregnation methods. Specific examples include methods in which phosphorus is supported on a crystalline aluminosilicate, crystalline aluminogallosilicate or crystalline aluminozincosilicate, methods in which a phosphorus compound is added during synthesis of the zeolite, thereby substituting a portion of the internal framework of the crystalline aluminosilicate with phosphorus, and methods in which a crystallization promoter containing phosphorus is used during synthesis of the zeolite. Although there are no particular limitations on the phosphate ion-containing aqueous solution used in the above methods, a solution prepared by dissolving phosphoric acid, diammonium hydrogen phosphate, ammonium dihydrogen phosphate or another water-soluble phosphate salt or the like in water at an arbitrary concentration can be used particularly favorably.

Examples of methods for incorporating boron within the monocyclic aromatic hydrocarbon production catalyst include ion-exchange methods and impregnation methods. Specific examples include methods in which boron is supported on a crystalline aluminosilicate, crystalline aluminogallosilicate or crystalline aluminozincosilicate, methods in which a boron compound is added during synthesis of the zeolite, thereby substituting a portion of the internal framework of the crystalline aluminosilicate with boron, and methods in which a crystallization promoter containing boron is used during synthesis of the zeolite.

The amount of phosphorus and/or boron included in the monocyclic aromatic hydrocarbon production catalyst, relative to the total mass of the catalyst, is preferably within a range from 0.1 to 10% by mass, wherein the lower limit is more preferably not less than 0.5% by mass, and the upper limit is more preferably not more than 9% by mass, and still more preferably not more than 8% by mass. Provided the amount of phosphorus relative to the total mass of the catalyst is at least 0.1% by mass, any deterioration over time in the yield of the monocyclic aromatic hydrocarbons can be prevented, and provided the amount of phosphorus is not more than 10% by mass, the yield of the monocyclic aromatic hydrocarbons can be increased.

[Gallium, Zinc]

If necessary, gallium and/or zinc may be included in the monocyclic aromatic hydrocarbon production catalyst. Including gallium and/or zinc can improve the rate of production of monocyclic aromatic hydrocarbons.

Examples of the form of the gallium contained within the monocyclic aromatic hydrocarbon production catalyst include catalysts in which the gallium is incorporated within the lattice framework of the crystalline aluminosilicate (crystalline aluminogallosilicates), catalysts in which gallium is supported on the crystalline aluminosilicate (gallium-supporting crystalline aluminosilicates), and catalysts including both of these forms.

Examples of the form of the zinc contained within the monocyclic aromatic hydrocarbon production catalyst include catalysts in which the zinc is incorporated within the lattice framework of the crystalline aluminosilicate (crystalline aluminozincosilicates), catalysts in which zinc is supported on the crystalline aluminosilicate (zinc-supporting crystalline aluminosilicates), and catalysts including both of these forms.

A crystalline aluminogallosilicate or a crystalline aluminozincosilicate has a structure in which $SiO_4$, $AlO_4$, and $GaO_4$ or $ZnO_4$ structures exist within the framework. A crystalline aluminogallosilicate or crystalline aluminozincosilicate can be obtained, for example, by gel crystallization via hydrothermal synthesis, or by a method in which gallium or zinc respectively is inserted into the lattice framework of a crystalline aluminosilicate. Further, a crystalline aluminogallosilicate or crystalline aluminozincosilicate can also be obtained by a method in which aluminum is inserted into the lattice framework of a crystalline gallosilicate or crystalline zincosilicate respectively.

A gallium-supporting crystalline aluminosilicate can be obtained by supporting gallium on a crystalline aluminosilicate using a conventional method such as an ion-exchange method or impregnation method. There are no particular limitations on the gallium source used in these methods, and examples include gallium salts such as gallium nitrate and gallium chloride, and gallium oxide.

A zinc-supporting crystalline aluminosilicate can be obtained by supporting zinc on a crystalline aluminosilicate using a conventional method such as an ion-exchange method or impregnation method. There are no particular limitations on the zinc source used in these methods, and examples include zinc salts such as zinc nitrate and zinc chloride, and zinc oxide.

In those cases where the monocyclic aromatic hydrocarbon production catalyst contains gallium and/or zinc, the amount of gallium and/or zinc within the monocyclic aromatic hydrocarbon production catalyst, relative to a value of 100% for the total mass of the catalyst, is preferably within a range from 0.01 to 5.0% by mass, and more preferably from 0.05 to 2.0% by mass. Provided the amount of gallium and/or zinc is at least 0.01% by mass, the rate of production of monocyclic aromatic hydrocarbons can be increased, and provided the amount is not more than 5.0% by mass, the yield of monocyclic aromatic hydrocarbons can be improved.

[Form]

The monocyclic aromatic hydrocarbon production catalyst is used in the form of a powder, granules or pellets or the like, depending on the reaction format. For example, a powder is used in the case of a fluidized bed, whereas granules or pellets are used in the case of a fixed bed. The average particle size of the catalyst used in a fluidized bed is preferably within a range from 30 to 180 μm, and more preferably from 50 to 100 μm. Further, the untamped density of the catalyst used in a fluidized bed is preferably within a range from 0.4 to 1.8 g/cc, and more preferably from 0.5 to 1.0 g/cc.

The average particle size describes the particle size at which the particle size distribution obtained by classification using sieves reaches 50% by mass, whereas the untamped density refers to the value measured using the method prescribed in JIS R 9301-2-3.

In order to obtain a catalyst in granular or pellet form, if necessary, an inert oxide may be added to the catalyst as a binder, with the resulting mixture then molded using any of various molding apparatus.

In those cases where the monocyclic aromatic hydrocarbon production catalyst contains an inorganic oxide such as a binder, a compound that contains phosphorus may be used as the binder.

(Reaction Temperature)

Although there are no particular limitations on the reaction temperature during contact of the feedstock oil with the monocyclic aromatic hydrocarbon production catalyst and subsequent reaction, a reaction temperature of 400 to 650° C. is preferred. Provided the lower limit for the reaction temperature is at least 400° C., the feedstock oil can be reacted with relative ease. The lower limit is more preferably 450° C. or higher. On the other hand, provided the upper limit temperature is not more than 650° C., the yield of monocyclic aromatic hydrocarbons can be increased. The upper limit is more preferably 600° C. or lower.

(Reaction Pressure)

The reaction pressure during contact of the feedstock oil with the monocyclic aromatic hydrocarbon production catalyst and subsequent reaction is preferably not more than 1.5 MPaG, and more preferably 1.0 MPaG or less. Provided the reaction pressure is not more than 1.5 MPaG, the generation of by-product light gases can be prevented, and the pressure resistance required for the reaction apparatus can be lowered.

(Contact Time)

There are no particular limitations on the contact time between the feedstock oil and the monocyclic aromatic hydrocarbon production catalyst, provided the desired reaction proceeds satisfactorily, but in terms of the gas transit time across the monocyclic aromatic hydrocarbon production catalyst, a time of 1 to 300 seconds is preferred. The lower limit for this time is more preferably at least 5 seconds, and the upper limit is more preferably 150 seconds or less. Provided the contact time is at least 1 second, a reliable reaction can be achieved, whereas provided the contact time is not more than 300 seconds, deposition of carbon matter on the catalyst due to coking or the like can be suppressed. Further, the amount of light gas generated by cracking can also be suppressed.

<Separation Step>

In the separation step, the product obtained in the cracking and reforming reaction step is separated into a plurality of fractions.

In order to achieve this separation into a plurality of fractions, a conventional distillation device or gas-liquid separation device may be used. One example of a distillation device is a device such as a stripper which employs a multi-stage distillation device to achieve separation by distillation into a plurality of fractions. One example of a gas-liquid separation device is a device containing a gas-liquid separation tank, a product inlet line through which the product is introduced into the gas-liquid separation tank, a gas component discharge line provided in the upper section of the gas-liquid separation tank, and a liquid component discharge line provided in the lower section of the gas-liquid separation tank.

In the separation step, it is preferable that at least the gas components and the liquid fraction are separated, and the liquid fraction may be further separated into a plurality of fractions. In one example of the separation step, the product is separated into a gas component containing mainly components of 4 or fewer carbon number (such as hydrogen, methane, ethane and LPG) and a liquid fraction. In an alternative separation step, the product may be separated into a gas component containing components of 2 or fewer carbon number (such as hydrogen, methane and ethane) and a liquid fraction. In yet another example of the separation step, the above liquid fraction may be separated into LPG, a fraction containing monocyclic aromatic hydrocarbons, and a heavy fraction. Further, in yet another example of the separation step, the above liquid fraction may be separated into LPG a fraction containing monocyclic aromatic hydrocarbons, and a plurality of heavy fractions. Moreover, in those cases where a fluidized bed is used as the reaction format for the cracking and reforming reaction step, the catalyst powder and the like incorporated within the product may also be removed in the separation step.

<Refining and Collection Step>

The refining and collection step is used for refining and collecting the monocyclic aromatic hydrocarbons obtained in the separation step.

In those cases where the liquid fraction has not undergone fractional distillation in the separation step, the refining and collection step may employ a process of separating and removing the fraction heavier than the monocyclic aromatic hydrocarbons, and collecting the monocyclic aromatic hydrocarbons, or benzene/toluene/xylene. In those cases where the fraction heavier than the monocyclic aromatic hydrocarbons has been separated in the separation step, the refining and collection step may employ a process of collecting the benzene/toluene/xylene. The fraction heavier than the monocyclic aromatic hydrocarbons refers to the heavy fraction of 9 or more carbon number, which contains mainly polycyclic aromatic hydrocarbons, and in particular, contains large amounts of naphthalene and alkylnaphthalenes.

<Heavy Fraction Discharge Step>

In the heavy fraction discharge step, a fixed portion of the heavy fraction of 9 or more carbon number obtained by separation by fractional distillation in the separation step is extracted and discharged outside the system. If the heavy fraction discharge step is not provided, then as the amount of recycling increases, the amount of low-reactivity components within the heavy fraction increases, but in the present embodiment, because a fixed portion of the heavy fraction is discharged in the heavy fraction discharge step, any increase in the amount of low-reactivity components within the heavy fraction can be suppressed. As a result, any deterioration over time in the yield of monocyclic aromatic hydrocarbons can be prevented.

The amount of the heavy fraction discharged outside the system is preferably not more than 90% by mass of the heavy fraction, more preferably not more than 50% by mass, and still more preferably 20% by mass or less. Provided the amount of the heavy fraction discharged outside the system is not more than 90% by mass of the heavy fraction, satisfactory recycling can be achieved, and the yield of monocyclic aromatic hydrocarbons can be increased. Although there are no particular limitations on the lower limit for the amount of the heavy fraction discharged outside the system, an amount of at least 0.5% by mass is preferable.

The heavier hydrocarbons within the heavy fraction are preferably extracted as the heavy fraction for discharge outside the system. For example, even if a fraction containing a large amount of tricyclic aromatic hydrocarbons is recycled, conversion to monocyclic aromatic hydrocarbons is comparatively difficult compared with other fractions, and therefore by discharging this fraction outside the system, any deterioration over time in the yield of the monocyclic aromatic hydrocarbons can be prevented. The heavy fraction discharged outside the system can be used as a fuel base stock or the like.

<Feedstock Oil Mixing Step>

In the feedstock oil mixing step, a portion of the feedstock oil for the cracking and reforming reaction step is mixed with the heavy fraction that was not discharged outside the system in the heavy fraction discharge step. By mixing a portion of the feedstock oil with the heavy fraction that was not discharged outside the system in the heavy fraction discharge step, the concentration of polycyclic aromatic hydrocarbons within the mixed oil supplied to the subsequent hydrogenation reaction step can be reduced to a level lower than the concentration of polycyclic aromatic hydrocarbons within the heavy fraction. By reducing the concentration of polycyclic aromatic hydrocarbons in this manner, the amount of heat generated in the hydrogenation reaction step can be suppressed, enabling a milder hydrogenation treatment, and the amounts of naphthenobenzenes within the hydrogenation reaction product can be increased. By supplying and recycling the hydrogenation reaction product obtained in this manner to the cracking and reforming reaction step, the yield of monocyclic aromatic hydrocarbons can be increased.

<Hydrogenation Reaction Step>

In the hydrogenation reaction step, the heavy fraction that was not discharged outside the system in the heavy fraction discharge step, or the mixed oil obtained in the feedstock oil mixing step by mixing the heavy fraction with a portion of the feedstock oil for the cracking and reforming reaction step (hereinafter, both cases are referred to using the term "heavy fraction"), is subjected to hydrogenation. Specifically, the heavy fraction and hydrogen are supplied to a hydrogenation reactor, and a hydrogenation catalyst is used to hydrotreat at least a portion of the polycyclic aromatic hydrocarbons contained within the heavy fraction.

The hydrogenation is preferably continued until the polycyclic aromatic hydrocarbons are converted to compounds having an average number of aromatic rings of one or less. For example, the hydrogenation is preferably performed until naphthalene is converted to tetralin (naphthenobenzene). If the hydrogenation is performed until the average number of aromatic rings is one or less, then the resulting product can be more readily converted to monocyclic aromatic hydrocarbons when returned to the cracking and reforming reaction step.

Further, in order to enable an additional increase in the yield of monocyclic aromatic hydrocarbons, the hydrogenation reaction step is preferably performed such that the amount of polycyclic aromatic hydrocarbons within the resulting hydrogenation reaction product of the heavy fraction is not more than 40% by mass, more preferably not more than 25% by mass, and still more preferably not more than 15% by mass. The amount of polycyclic aromatic hydrocarbons within the hydrogenation reaction product obtained upon completion of the hydrogenation reaction step is preferably lower than the polycyclic aromatic hydrocarbon content of the feedstock oil. The amount of polycyclic aromatic hydrocarbons within the hydrogenation reaction product can be reduced by increasing the amount of the hydrogenation catalyst and/or increasing the hydrogenation reaction pressure. However, there is no need to continue the hydrogenation reaction until all of the polycyclic aromatic hydrocarbons have been converted to saturated hydrocarbons. Excessive hydrogenation tends to result in increased hydrogen consumption and increased heat generation.

In the present embodiment, the hydrogen produced as a by-product in the cracking and reforming reaction step can be used as the hydrogen for the hydrogenation reaction step. In other words, hydrogen can be collected from the gas component obtained in the separation step in the hydrogen collection step described below, and the collected hydrogen can then be supplied to the hydrogenation reaction step in the hydrogen supply step.

A fixed bed can be used favorably as the reaction format for the hydrogenation reaction step.

Conventional hydrogenation catalysts may be used as the hydrogenation catalyst, including nickel catalysts, palladium catalysts, nickel-molybdenum catalysts, cobalt-molybdenum catalysts, nickel-cobalt-molybdenum catalysts and nickel-tungsten catalysts.

The hydrogenation reaction temperature varies depending on the hydrogenation catalyst used, but is typically within a range from 100 to 450° C., preferably from 200 to 400° C., and more preferably from 250 to 380° C.

The hydrogenation reaction pressure varies depending on the hydrogenation catalyst used and the nature of the feedstock, but is preferably within a range from 0.7 MPa to 13 MPa, more preferably from 1 MPa to 10 MPa, and still more preferably from 1 MPa to 7 MPa. Provided the hydrogenation reaction pressure is not more than 13 MPa, a hydrogenation reactor with minimal pressure resistance can be used, thereby reducing equipment costs.

On the other hand, in terms of the yield of the hydrogenation reaction, the hydrogenation reaction pressure is preferably at least 0.7 MPa.

The amount of hydrogen consumed is preferably not more than 3,000 scfb (506 $Nm^3/m^3$), more preferably not more than 2,500 scfb (422 $Nm^3/m^3$), and still more preferably 1,500 scfb (253 $Nm^3/m^3$) or less.

On the other hand, in terms of the yield of the hydrogenation reaction, the amount of hydrogen consumed is preferably at least 300 scfb (50 $Nm^3/m^3$).

The liquid hourly space velocity (LHSV) is preferably within a range from $0.1\ h^{-1}$ to $20\ h^{-1}$, and more preferably from $0.2^{-1}$ to $10\ h^{-1}$. Provided the LHSV is not more than 20 $h^{-1}$, the polycyclic aromatic hydrocarbons can be satisfactorily hydrogenated at a lower hydrogenation reaction pressure. In contrast, ensuring that the LHSV is at least $0.1\ h^{-1}$ avoids the need to increase the size of the hydrogenation reactor.

<Hydrogen Recovery Step>

In the hydrogen recovery step, hydrogen is recovered from the gas component obtained in the separation step.

There are no particular limitations on the method used for recovering the hydrogen, provided it enables the hydrogen contained within the gas component obtained in the separation step to be separated from the other gases within the gas component, and examples include the pressure swing adsorption method (PSA method), cryogenic separation methods, and membrane separation methods.

Typically, the amount of hydrogen recovered in the hydrogen recovery step is larger than the amount of hydrogen required to hydrogenate the heavy fraction.

<Hydrogen Supply Step>

In the hydrogen supply step, the hydrogen obtained in the hydrogen recovery step is supplied to the hydrogenation reactor used in the hydrogenation reaction step. The amount of hydrogen supplied is adjusted in accordance with the amount of the heavy fraction supplied to the hydrogenation reaction step. Further, the hydrogen pressure may also be altered as required.

If a hydrogen supply step is provided as in the present embodiment, then the hydrogen produced as a by-product in the preceding cracking and reforming reaction step can be used for hydrogenating the heavy fraction. By supplying some or all of the hydrogen used in the method for producing monocyclic aromatic hydrocarbons according to the present invention from by-product hydrogen, supply of hydrogen from an external source can be partially or completely eliminated.

<Recycling Step>

In the recycling step, the heavy fraction hydrogenation reaction product obtained in the hydrogenation reaction step is mixed with the feedstock oil and returned to the cracking and reforming reaction step.

By returning the heavy fraction hydrogenation reaction product obtained by hydrotreating the heavy fraction to the cracking and reforming reaction step, the heavy fraction that represents a by-product can be used as a feedstock for producing monocyclic aromatic hydrocarbons. As a result, the amount of by-products can be reduced, and the production of monocyclic aromatic hydrocarbons can be increased. Further, because saturated hydrocarbons are also produced in the hydrogenation reaction step, hydrogen transfer reactions in the cracking and reforming reaction step can be accelerated. For these reasons, the overall yield of monocyclic aromatic hydrocarbons relative to the amount of feedstock oil supplied can be increased.

If the heavy fraction is simply returned to the cracking and reforming reaction step without first undergoing hydrotreatment, then because the reactivity of the polycyclic aromatic hydrocarbons is low, there is almost no improvement in the yield of monocyclic aromatic hydrocarbons.

[Second Embodiment]

A second embodiment of the method for producing monocyclic aromatic hydrocarbons according to the present invention is described below.

Figure 2:
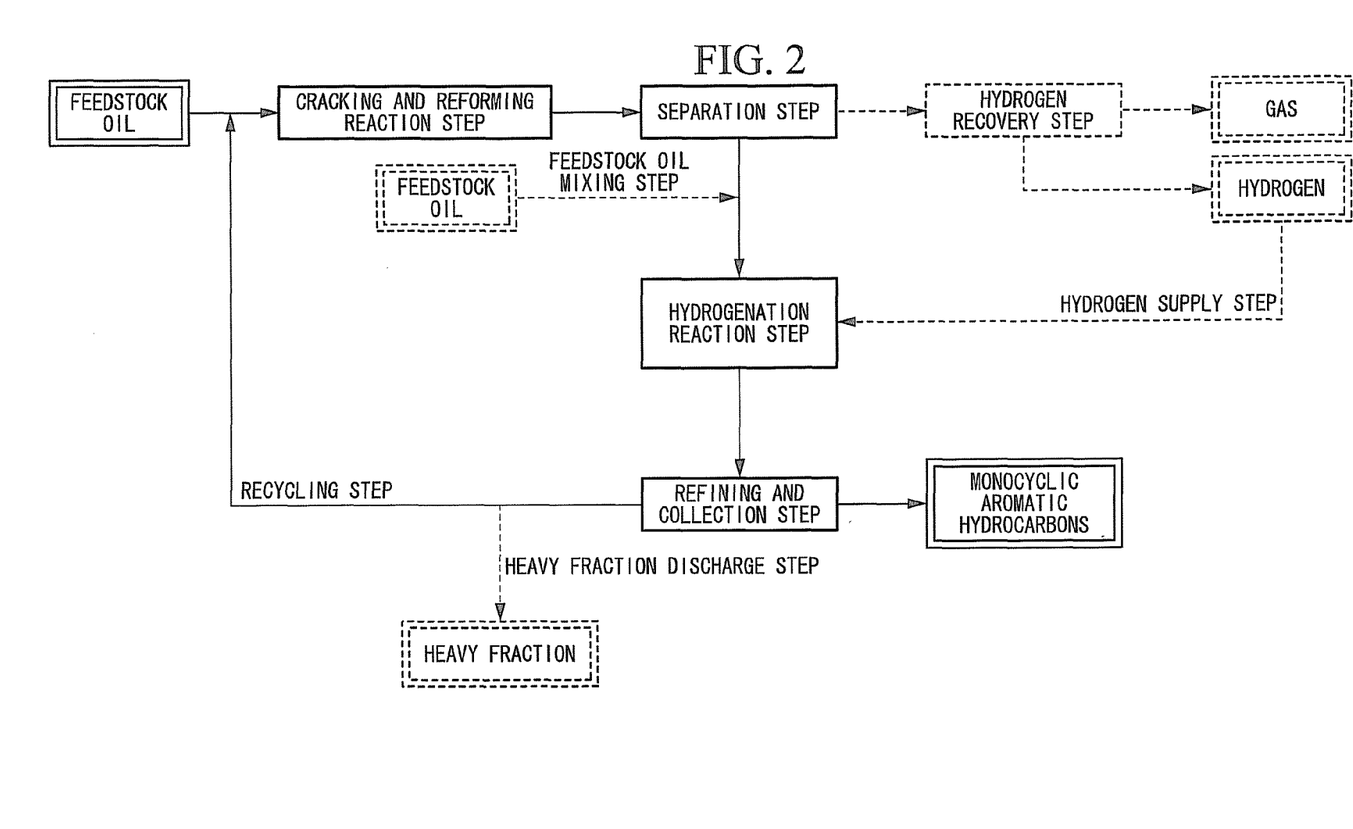
FIG. 2 is a diagram describing a second embodiment of the method for producing monocyclic aromatic hydrocarbons according to the present invention.

The method for producing monocyclic aromatic hydrocarbons according to this embodiment is a method for producing monocyclic aromatic hydrocarbons from a feedstock oil that represents an embodiment of aspect [3] of the present invention, and includes the steps (j) to (r) described below (see FIG. 2).

(j) A cracking and reforming reaction step of bringing a feedstock oil into contact with a monocyclic aromatic hydrocarbon production catalyst, and reacting the feedstock oil to obtain a product containing monocyclic aromatic hydrocarbons.

(k) A separation step of separating the product obtained in the cracking and reforming reaction step into a gas component and a liquid component.

(l) A feedstock oil mixing step of mixing a portion of the feedstock oil with a portion of the liquid fraction separated in the separation step.

(m) A hydrogenation reaction step of hydrogenating a portion of the liquid fraction separated in the separation step, or the mixed oil prepared by mixing the liquid fraction and a portion of the feedstock oil.

(n) A hydrogen recovery step of recovering, from the gas component separated in the separation step, the hydrogen produced as a byproduct in the cracking and reforming reaction step.

(o) A hydrogen supply step of supplying the hydrogen recovered in the hydrogen recovery step to the hydrogenation reaction step.

(p) A refining and collection step of refining and collecting monocyclic aromatic hydrocarbons by distilling the hydrogenation reaction product obtained in the hydrogenation reaction step.

(q) A heavy fraction discharge step of discharging outside the system a portion of the heavy fraction obtained by separation from the monocyclic aromatic hydrocarbons in the refining and collection step.

(r) A recycling step of returning, to the cracking and reforming reaction step, the heavy fraction that was not discharged outside the system in the heavy fraction discharge step.

Of the steps (j) to (r) described above, the steps (j), (m), (p) and (r) are essential steps in the method according to the second embodiment, whereas the steps (k), (l), (n), (o) and (q) are optional steps.

The cracking and reforming reaction step (j) may be performed in the same manner as the cracking and reforming reaction step (a) in the first embodiment.

The separation step (k) may be performed in the same manner as the separation step (b) in the first embodiment. For example, a separation may be performed in which the product is separated into a gas component containing components of 4 or fewer carbon number (such as hydrogen, methane, ethane and LPG) and a liquid fraction. The liquid fraction undergoes separation in the refining and collection step (p), and therefore unlike the first embodiment, separation of the liquid fraction into a fraction containing monocyclic aromatic hydrocarbons and a heavy fraction need not be performed at this point. However, an extremely heavy fraction that is unsuitable for the recycling that represents the object of the present invention, and/or a catalyst powder that is incorporated within the product in those cases where a fluidized bed is employed in the cracking and reforming reaction step may be removed as required. However, even in such cases, the monocyclic aromatic hydrocarbons and the heavy fraction that is to undergo hydrogenation and recycling are not separated at this point.

The feedstock oil mixing step (l) may be performed in the same manner as the feedstock oil mixing step (e) of the first embodiment, with the exception that the liquid component obtained in the separation step (k) is used for mixing with the feedstock oil instead of the heavy fraction that was not discharged outside the system that was used in the feedstock oil mixing step (e).

The hydrogen recovery step (n) may be performed in the same manner as the hydrogen recovery step (g) of the first embodiment.

The hydrogen supply step (o) may be performed in the same manner as the hydrogen supply step (h) of the first embodiment.

The hydrogenation reaction step (m) of the present embodiment may use the same hydrogenation catalyst as that used in the hydrogenation reaction step (f) of the first embodiment.

In the hydrogenation reaction step (m), unlike the hydrogenation reaction step (f) of the first embodiment, the entire liquid component obtained in the separation step, or the mixed oil obtained in the feedstock oil mixing step (l) by mixing the liquid component obtained in the separation step with a portion of the feedstock oil for the cracking and reforming reaction step, is fed through the hydrogenation reactor, and therefore the obtained monocyclic aromatic hydrocarbons are also hydrogenated. However, hydrogenation of the monocyclic aromatic hydrocarbons negates the object of the present invention. Accordingly, the loss of monocyclic aromatic hydrocarbons by hydrogenation in the hydrogenation reaction step, reported relative to a value of 100% by mass for the mass of monocyclic aromatic hydrocarbons prior to the hydrogenation reaction step, is preferably not more than 5% by mass. The reaction conditions required to achieve such minimal loss substantially satisfy the reaction condition ranges described above for the first embodiment, but in order to avoid excessive hydrogenation of the monocyclic aromatic hydrocarbons, the hydrogenation is preferably performed at a higher temperature than that used in the first embodiment.

For example, the hydrogenation reaction temperature varies depending on the hydrogenation catalyst used, but is typically within a range from 250 to 450° C., preferably from 300 to 400° C., and more preferably from 320 to 380° C.

In the refining and collection step (p), the monocyclic aromatic hydrocarbons or the benzene/toluene/xylene is collected, and the fraction that is heavier than the monocyclic aromatic hydrocarbons is separated and removed. This fraction that is heavier than the monocyclic aromatic hydrocarbons is a heavy fraction of 9 or more carbon number, and contains mainly hydrogenation reaction products of polycyclic aromatic hydrocarbons and non-hydrogenated polycyclic aromatic hydrocarbons.

In the heavy fraction discharge step (q), in a similar manner to that described for the heavy fraction discharge step (d) in the first embodiment, the amount of the heavy fraction discharged outside the system is preferably not more than 90% by mass of the heavy fraction, more preferably not more than 50% by mass, and still more preferably 20% by mass or less. Although there are no particular limitations on the lower limit for the amount of the heavy fraction discharged outside the system, an amount of at least 0.5% by mass is preferable.

In the recycling step (r), the hydrogenation reaction product of the heavy fraction that was not discharged outside the system is mixed with the feedstock oil and returned to the cracking and reforming reaction step.

In this embodiment, in a similar manner to that described for the first embodiment, the hydrogenation reaction product of the heavy fraction is returned to the cracking and reforming reaction step, and therefore the heavy fraction that represents a by-product can be used as a feedstock for producing monocyclic aromatic hydrocarbons. As a result, the amount of by-products can be reduced, and the production of monocyclic aromatic hydrocarbons can be increased. Further, hydrogen transfer reactions within the cracking and reforming reaction step can also be accelerated. Accordingly, the overall yield of monocyclic aromatic hydrocarbons relative to the amount of feedstock oil supplied can be increased.

[Third Embodiment]

A third embodiment of the method for producing monocyclic aromatic hydrocarbons according to the present invention is described below.

Figure 3:
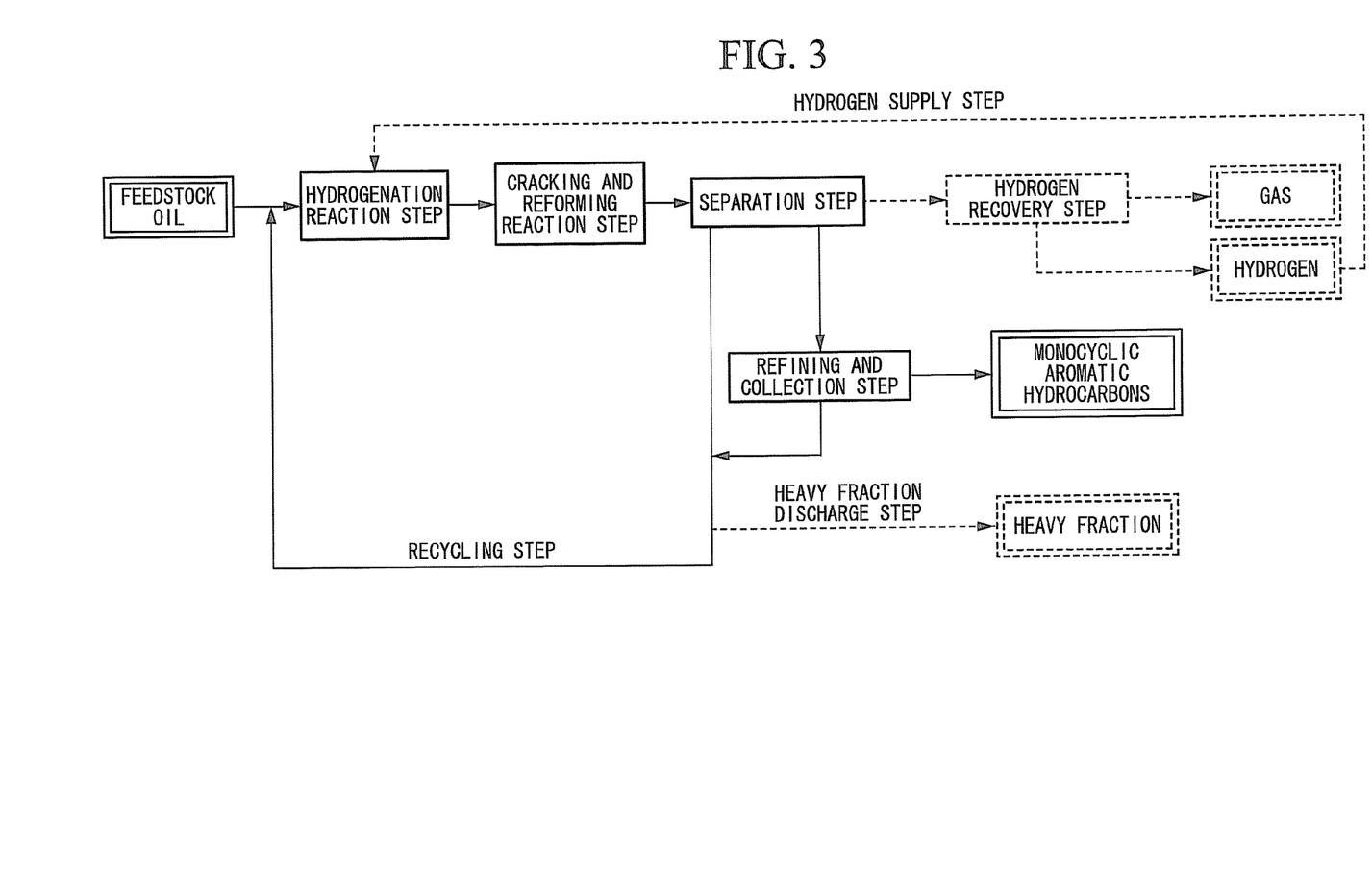
FIG. 3 is a diagram describing a third embodiment of the method for producing monocyclic aromatic hydrocarbons according to the present invention.

The method for producing monocyclic aromatic hydrocarbons according to this embodiment is a method for producing monocyclic aromatic hydrocarbons from a feedstock oil that represents an embodiment of aspect [5] of the present invention, and includes the steps (s) to (z) described below (see FIG. 3).

(s) A hydrogenation reaction step of hydrogenating the feedstock oil.
(t) A cracking and reforming reaction step of bringing the hydrogenation reaction product obtained in the hydrogenation reaction step into contact with a monocyclic aromatic hydrocarbon production catalyst, and reacting the hydrogenation reaction product to obtain a product containing monocyclic aromatic hydrocarbons.
(u) A separation step of separating the product obtained in the cracking and reforming reaction step into a plurality of fractions.
(v) A refining and collection step of refining and collecting monocyclic aromatic hydrocarbons separated in the separation step.
(w) A heavy fraction discharge step of discharging outside the system a portion of the heavy fraction of 9 or more carbon number (hereinafter referred to as simply the "heavy fraction") obtained from a fraction separated in the separation step.
(x) A recycling step of returning, to the hydrogenation reaction step, the heavy fraction that was not discharged outside the system in the heavy fraction discharge step.
(y) A hydrogen recovery step of recovering, from the gas component separated in the separation step, the hydrogen produced as a byproduct in the cracking and reforming reaction step.
(z) A hydrogen supply step of supplying the hydrogen recovered in the hydrogen recovery step to the hydrogenation reaction step.

Of the steps (s) to (z) described above, the steps (s), (t), (v) and (x) are essential steps in the method according to the third embodiment, whereas the steps (u), (w), (y) and (z) are optional steps.

The hydrogenation reaction step (s) of the present embodiment may use the same hydrogenation catalyst as that used in the hydrogenation reaction step (f) of the first embodiment.

In the hydrogenation reaction step (s), instead of the heavy fraction that was treated in the hydrogenation reaction step (f) of the first embodiment, either the feedstock oil for the cracking and reforming reaction step (a) of the first embodiment, or a mixed oil of the feedstock oil and the heavy fraction returned to the hydrogenation reaction step in the recycling step (x), is hydrotreated. Besides this difference in the oil undergoing treatment, the reaction conditions satisfy the ranges described for the first embodiment, although the conditions may need to be adjusted appropriately within those ranges.

In the hydrogenation reaction step (s), a hydrogenation reaction product is obtained from a mixture of the feedstock oil and the heavy fraction, but the amount of polycyclic aromatic hydrocarbons within the hydrogenation reaction product is preferably not more than 20% by mass, and more preferably not more than 10% by mass. Further, the amount of saturated hydrocarbons is preferably not more than 60% by mass, and more preferably not more than 40% by mass.

Provided the ratio between the polycyclic aromatic hydrocarbons and saturated hydrocarbons within the hydrogenation reaction product satisfies the ranges described above, the yield of monocyclic aromatic hydrocarbons in the subsequent cracking and reforming reaction step (t) can be improved.

The cracking and reforming reaction step (t) may be performed in the same manner as the cracking and reforming reaction step (a) in the first embodiment.

The separation step (u) may be performed in the same manner as the separation step (b) in the first embodiment.

The refining and collection step (v) may be performed in the same manner as the refining and collection step (c) in the first embodiment.

The heavy fraction discharge step (w) may be performed in the same manner as the heavy fraction discharge step (d) in the first embodiment.

In the recycling step (x), the heavy fraction that was not discharged outside the system is mixed with the feedstock oil and returned to the hydrogenation reaction step.

The heavy fraction typically contains from 50 to 95% by mass of polycyclic aromatic hydrocarbons, and generates an extremely large amount of heat in the hydrogenation reaction, meaning heat generation must be suppressed, but in the present embodiment, by returning the heavy fraction to the hydrogenation reaction step and mixing the heavy fraction with the feedstock oil, the polycyclic aromatic hydrocarbon concentration, which was 50 to 95% by mass within the heavy fraction, is preferably reduced to not more than 50% by mass, more preferably not more than 30% by mass, and still more preferably 20% by mass or less, thus enabling suppression of heat generation in the hydrogenation reaction step.

Further, because the heavy fraction is supplied, via the hydrogenation reaction step, to the cracking and reforming reaction step, the heavy fraction by-product can also be used as a feedstock for obtaining monocyclic aromatic hydrocarbons. As a result, not only can the amount of by-products be reduced, but the amount of monocyclic aromatic hydrocarbons produced can be increased. Moreover, hydrogen transfer reactions in the cracking and reforming reaction step can be accelerated. For these reasons, the overall yield of monocyclic aromatic hydrocarbons relative to the amount of feedstock oil supplied can be increased.

The amount of the heavy fraction mixed with the feedstock oil may be selected appropriately so that the polycyclic aromatic hydrocarbon concentration within the mixed oil satisfies the range described above (not more than 50% by mass). Typically, the amount of the heavy fraction is equivalent to a mass ratio within a range from 15 to 70 relative to a value of 100 for the feedstock oil.

The hydrogen recovery step (y) may be performed in the same manner as the hydrogen recovery step (g) of the first embodiment.

The hydrogen supply step (z) may be performed in the same manner as the hydrogen supply step (h) of the first embodiment.

[Other Embodiments]

The present invention is not limited to the first, second and third embodiments described above. For example, the hydrogen used in the hydrogenation reaction step need not necessarily be the hydrogen produced as a by-product in the cracking and reforming reaction step. Hydrogen obtained using a conventional hydrogen production method may be used, or hydrogen obtained as a by-product in another contact cracking method may be used.

Further, in the first and third embodiments, the heavy fraction discharge step may be provided after the hydrogenation reaction step.

EXAMPLES

Reference Test 1

Test Examples 1 to 4

The hydrogenation of polycyclic aromatic hydrocarbons was investigated. Specifically, 90 mL of each of the polycyclic aromatic hydrocarbon samples shown in Table 1 was hydrogenated inside a 200 mL autoclave under the reaction conditions shown in Table 1. The results of analyzing the reaction products are shown in Table 1.

This Reference Test 1 revealed that hydrogenation of polycyclic aromatic hydrocarbons resulted in a conversion to decalin (naphthene) and tetralin (naphthenobenzene). Further the test also revealed that the conditions could be selected to enable preferential production of naphthenobenzene over naphthene.

Reference Test 2

Test Examples 11 to 17

The production of monocyclic aromatic hydrocarbons from naphthene, naphthenobenzene and naphthalene was investigated. Specifically, using a gallium-supporting MFI (amount of supported gallium: 1.6% by mass) as the monocyclic aromatic hydrocarbon production catalyst, and using either a fixed bed or fluidized bed reaction format, reaction was performed under a reaction pressure of 0.3 MPa for a contact time of 7 seconds, at the reaction temperature shown in Table 2. The yield of monocyclic aromatic hydrocarbons is shown in Table 2.

TABLE 2

| Test Example | Feedstock | Reaction format | Reaction temperature (° C.) | Monocyclic aromatic hydrocarbons (% by mass) |
| --- | --- | --- | --- | --- |
| 11 | Tetralin | Fixed bed | 450 | 53 |
| 12 | Tetralin | Fixed bed | 538 | 43 |
| 13 | Decalin | Fixed bed | 450 | 37 |
| 14 | Decalin | Fixed bed | 538 | 51 |
| 15 | Naphthalene | Fixed bed | 538 | 3 |
| 16 | Methyldecalin 11% by mass Methyltetralin 89% by mass | Fixed bed | 538 | 44 |
| 17 | Methyldecalin 11% by mass Methyltetralin 89% by mass | Fluidized bed | 538 | 40 |

This Reference Test 2 revealed that only a very small amount of monocyclic aromatic hydrocarbons is obtained from naphthalene, but that monocyclic aromatic hydrocarbons could be produced favorably from decalin (naphthene) and tetralin (naphthenobenzene), which are hydrogenated products of naphthalene. These results confirmed that by hydrogenating naphthalene to form naphthenobenzene, the naphthenobenzene could then be easily converted to monocyclic aromatic hydrocarbons.

TABLE 1

| Test Example | Polycyclic aromatic hydrocarbon | Catalyst | Hydrogenation temperature (° C.) | Hydrogenation pressure (MPaG) | Reaction time (hours) | Decalin (% by mass) | Tetralin (% by mass) | Naphthalene (% by mass) |
| --- | --- | --- | --- | --- | --- | --- | --- | --- |
| 1 | Naphthalene | Ni catalyst[*1] | 160 | 1.5 | 3 | 26 | 74 | 0 |
| 2 | Naphthalene | Ni catalyst[*1] | 160 | 1.5 | 6 | 62 | 38 | 0 |
| 3 | Methyltetralin 39% by mass Methylnaphthalene 61% by mass | Ni catalyst[*1] | 160 | 1.5 | 3 | 11 (some methyl groups) | 89 (some methyl groups) | 0 |
| 4 | Naphthalene | NiMo catalyst[*2] | 350 | 4.0 | 3 | 5 | 66 | 29 |

[*1]Ni Catalyst: 50% by mass Ni/diatomaceous earth, 0.25 g
[*2]NiMo catalyst: 0.5 g

Test Example 3

Examples 1 to 3, Comparative Examples 1 and 2, and Reference Example 1

An LCO shown in Table 3 (10 volume % distillation temperature: 224.5° C., 90 volume % distillation temperature: 349.5° C.) was reacted using an MFI-type zeolite on which 0.2% by mass of gallium and 0.7% by mass of phosphorus had been supported as the reaction catalyst, using either a fixed bed or fluidized bed reaction format, and under conditions including a reaction temperature of 538° C., a reaction pressure of 0.3 MPaG, and a contact time between the LCO and the zeolite component of the catalyst of 7 seconds, thus producing monocyclic aromatic hydrocarbons. In the case of the fixed bed reaction format, the MFI-type zeolite on which 0.2% by mass of gallium and 0.7% by mass of phosphorus had been supported was used as the catalyst, whereas in the case of the fluidized bed reaction format, a material prepared by adding a binder to the MFI-type zeolite on which 0.2% by mass of gallium and 0.7% by mass of phosphorus had been supported was used as the catalyst. As a result, monocyclic aromatic hydrocarbons (benzene, toluene, xylene) were obtained at a yield of 40% by mass. Further, investigation of the amount of polycyclic aromatic hydrocarbons within the heavy fraction obtained following collection of the monocyclic aromatic hydrocarbons revealed a result of 68% by mass.

Subsequently, the above heavy fraction was hydrotreated using a commercially available nickel-molybdenum catalyst, under conditions including a hydrogenation reaction temperature of 350° C., a hydrogenation reaction pressure of 5 MPa, and LHSV=0.5 h$^{-1}$. The thus obtained hydrogenation reaction product contained 52% by mass of compounds having one aromatic ring and 7% by mass of compounds having two or more aromatic rings (polycyclic aromatic hydrocarbons), which was a lower polycyclic aromatic hydrocarbon content than the feedstock LCO.

Next, as examples of recycling the hydrotreated heavy fraction into the feedstock oil, the amount of the hydrotreated heavy fraction recycled was varied to obtain the feedstock oils shown in Table 4. Each of these feedstock oils was reacted using an MFI-type zeolite on which 0.2% by mass of gallium and 0.7% by mass of phosphorus had been supported as the reaction catalyst, using either a fixed bed or fluidized bed reaction format, and under conditions including a reaction temperature of 538° C., a reaction pressure of 0.3 MPaG, and a contact time between the feedstock oil and the zeolite component of the catalyst of 7 seconds, thus producing monocyclic aromatic hydrocarbons. In the case of the fixed bed reaction format, the MFI-type zeolite on which 0.2% by mass of gallium and 0.7% by mass of phosphorus had been supported was used as the catalyst, whereas in the case of the fluidized bed reaction format, a material prepared by adding a binder to the MFI-type zeolite on which 0.2% by mass of gallium and 0.7% by mass of phosphorus had been supported was used as the catalyst. The yields of monocyclic aromatic hydrocarbons are shown in Table 4.

TABLE 3

| Feedstock Properties | | | | Analysis method |
|---|---|---|---|---|
| Density (measurement temperature: 15° C.) | | g/cm$^3$ | 0.906 | JIS K 2249 |
| Kinematic viscosity (measurement temperature: 30° C.) | | mm$^2$/s | 3.640 | JIS K 2283 |
| Distillation properties | Initial boiling point | ° C. | 175.5 | JIS K 2254 |
| | 10 volume % distillation temperature | ° C. | 224.5 | |
| | 50 volume % distillation temperature | ° C. | 274.0 | |
| | 90 volume % distillation temperature | ° C. | 349.5 | |
| | End point | ° C. | 376.0 | |
| Composition analysis | Saturated fraction | volume % | 35 | JPI-5S-49 |
| | Olefin fraction | volume % | 8 | |
| | Total aromatic fraction | volume % | 57 | |
| | Monocyclic aromatic fraction | volume % | 23 | |
| | Bicyclic aromatic fraction | volume % | 25 | |
| | Tricyclic or higher aromatic fraction | volume % | 9 | |

TABLE 4

| Test Example 3 | Feedstock oil | Reaction format | Monocyclic aromatic hydrocarbons (% by mass) |
|---|---|---|---|
| Example 1 | Heavy fraction hydrogenation reaction product (100% by mass) | Fixed bed | 44 |
| Comparative example 1 | Heavy fraction (100% by mass) | Fixed bed | 8 |
| Example 2 | Mixture of heavy fraction hydrogenation reaction product (30% by mass) and LCO (70% by mass) | Fixed bed | 40 |
| Example 3 | Mixture of heavy fraction hydrogenation reaction product (30% by mass) and LCO (70% by mass) | Fluidized bed | 36 |
| Comparative example 2 | Mixture of heavy fraction (30% by mass) and LCO (70% by mass) | Fixed bed | 27 |
| Reference Example 1 | LCO (100% by mass) | Fixed bed | 40 |

Example 4

An LCO2 shown in Table 5 (10 volume % distillation temperature: 215° C., 90 volume % distillation temperature: 318° C.) was reacted using a catalyst prepared by adding a binder to an MFI-type zeolite on which 0.2% by mass of gallium and 0.7% by mass of phosphorus had been supported, using a fluidized bed reaction format, and under conditions including a reaction temperature of 538° C., a reaction pressure of 0.3 MPaG, and a contact time between the LCO2 and the zeolite component of the catalyst of 12 seconds, thus producing monocyclic aromatic hydrocarbons. As a result, monocyclic aromatic hydrocarbons (benzene, toluene, xylene) were obtained at a yield of 35% by mass. Further, investigation of the amount of polycyclic aromatic hydrocarbons within the heavy fraction obtained following collection of the monocyclic aromatic hydrocarbons revealed a result of 81% by mass.

Subsequently, the above heavy fraction was hydrotreated using a commercially available nickel-molybdenum catalyst, under conditions including a hydrogenation reaction temperature of 350° C., a hydrogenation reaction pressure of 5 MPa, and LHSV=0.5 h$^{-1}$. The thus obtained hydrogenation reaction product contained 78% by mass of compounds having one aromatic ring and 8% by mass of compounds having two or more aromatic rings (polycyclic aromatic hydrocarbons), which was a lower polycyclic aromatic hydrocarbon content than the feedstock LCO2.

Next, a recycled oil prepared by mixing the thus obtained hydrogenation reaction product with the LCO2 in a mass ratio of hydrogenation reaction product:LCO2 of 30:70 was used as a feedstock oil, and this feedstock oil was reacted using a catalyst prepared by adding a binder to an MFI-type zeolite on which 0.2% by mass of gallium and 0.7% by mass of phosphorus had been supported, using a fluidized bed reaction format, and under conditions including a reaction temperature of 538° C., a reaction pressure of 0.3 MPaG, and a contact time between the feedstock oil and the zeolite component of the catalyst of 12 seconds, thus producing monocyclic aromatic hydrocarbons. The yield of monocyclic aromatic hydrocarbons is shown in Table 6.

Example 5

An LCO2 shown in Table 5 (10 volume % distillation temperature: 215° C., 90 volume % distillation temperature: 318° C.) was reacted using a catalyst prepared by adding a binder to an MFI-type zeolite on which 0.2% by mass of gallium and 0.7% by mass of phosphorus had been supported, using a fluidized bed reaction format, and under conditions including a reaction temperature of 538° C., a reaction pressure of 0.3 MPaG, and a contact time between the LCO2 and the zeolite component of the catalyst of 12 seconds, thus producing monocyclic aromatic hydrocarbons. As a result, monocyclic aromatic hydrocarbons (benzene, toluene, xylene) were obtained at a yield of 35% by mass. Further, investigation of the amount of polycyclic aromatic hydrocarbons within the heavy fraction obtained following collection of the monocyclic aromatic hydrocarbons revealed a result of 81% by mass.

Subsequently, a mixed oil of the above heavy fraction (50% by mass) and the LCO2 (50% by mass) was hydrotreated using a commercially available nickel-molybdenum catalyst, under conditions including a hydrogenation reaction temperature of 350° C., a hydrogenation reaction pressure of 5 MPa, and LHSV=0.5 h$^{-1}$. The thus obtained hydrogenation reaction product contained 63% by mass of compounds having one aromatic ring and 8% by mass of compounds having two or more aromatic rings (polycyclic aromatic hydrocarbons), which was a lower polycyclic aromatic hydrocarbon content than the heavy fraction.

Next, a recycled oil prepared by mixing the thus obtained hydrogenation reaction product with the LCO2 in a mass ratio of hydrogenation reaction product:LCO2 of 30:70 was used as a feedstock oil, and this feedstock oil was reacted using a catalyst prepared by adding a binder to an MFI-type zeolite on which 0.2% by mass of gallium and 0.7% by mass of phosphorus had been supported, using a fluidized bed reaction format, and under conditions including a reaction temperature of 538° C., a reaction pressure of 0.3 MPaG, and a contact time between the feedstock oil and the zeolite component of the catalyst of 12 seconds, thus producing monocyclic aromatic hydrocarbons. The yield of monocyclic aromatic hydrocarbons is shown in Table 6.

Example 6

An LCO2 shown in Table 5 (10 volume % distillation temperature: 215° C., 90 volume % distillation temperature: 318° C.) was reacted using a catalyst prepared by adding a binder to an MFI-type zeolite on which 0.2% by mass of gallium and 0.7% by mass of phosphorus had been supported, using a fluidized bed reaction format, and under conditions including a reaction temperature of 538° C., a reaction pressure of 0.3 MPaG, and a contact time between the LCO2 and the zeolite component of the catalyst of 12 seconds, thus effecting a cracking and reforming reaction. Following separation of a gas component containing ethane and propane gas and hydrogen gas and the like, the liquid component was hydrotreated using a commercially available nickel-molybdenum catalyst, under conditions including a hydrogenation reaction temperature of 350° C., a hydrogenation reaction pressure of 6 MPa, and LHSV=0.5 h$^{-1}$. Separation of the resulting hydrogenation reaction product by distillation into a fraction containing monocyclic aromatic hydrocarbons (benzene, toluene, xylene) and a heavier fraction, yielded 48% by mass of the fraction containing monocyclic aromatic hydrocarbons and 52% by mass of the hydrogenated heavy fraction. The collected hydrogenated heavy fraction contained 77% by mass of compounds having one aromatic ring and 8% by mass of compounds having two or more aromatic rings (polycyclic aromatic hydrocarbons).

Subsequently, a recycled oil prepared by mixing the thus obtained hydrogenated heavy fraction with the LCO2 in a mass ratio of hydrogenated heavy fraction:LCO2 of 30:70 was used as a feedstock oil, and this feedstock oil was reacted using a catalyst prepared by adding a binder to an MFI-type zeolite on which 0.2% by mass of gallium and 0.7% by mass of phosphorus had been supported, using a fluidized bed reaction format, and under conditions including a reaction temperature of 538° C., a reaction pressure of 0.3 MPaG, and a contact time between the feedstock oil and the zeolite component of the catalyst of 12 seconds, thus producing monocyclic aromatic hydrocarbons. The yield of monocyclic aromatic hydrocarbons is shown in Table 6.

Example 7

An LCO2 shown in Table 5 (10 volume % distillation temperature: 215° C., 90 volume % distillation temperature: 318° C.) was hydrotreated using a commercially available nickel-molybdenum catalyst, under conditions including a hydrogenation reaction temperature of 350° C., a hydrogenation reaction pressure of 5 MPa, and LHSV=0.5 h$^{-1}$, thus yielding a hydrogenated LCO2. The thus obtained hydrogenated LCO2 was reacted using a fluidized bed, using a catalyst prepared by adding a binder to an MFI-type zeolite on which 0.2% by mass of gallium and 0.7% by mass of phosphorus had been supported, and under conditions including a reaction temperature of 538° C., a reaction pressure of 0.3 MPaG, and a contact time between the hydrogenated LCO2 and the zeolite component of the catalyst of 12 seconds, thus effecting a cracking and reforming reaction. As a result, monocyclic aromatic hydrocarbons (benzene, toluene, xylene) were obtained at a yield of 40% by mass. Further, investigation of the amount of polycyclic aromatic hydrocarbons within the heavy fraction obtained following collection of the monocyclic aromatic hydrocarbons revealed a result of 79% by mass.

Subsequently, the heavy fraction was mixed with the LCO2 in a mass ratio of heavy fraction:LCO2 of 30:70, and this mixed oil was recycled to a stage within the production method prior to the hydrogenation reaction step. A hydrotreatment was performed under the hydrotreatment conditions described above, and the resulting hydrogenation reaction product was reacted using a catalyst prepared by adding a binder to an MFI-type zeolite on which 0.2% by mass of gallium and 0.7% by mass of phosphorus had been supported, using a fluidized bed reaction format, and under conditions including a reaction temperature of 538° C., a reaction pressure of 0.3 MPaG, and a contact time with the zeolite component of the catalyst of 12 seconds, thus producing monocyclic aromatic hydrocarbons. The yield of monocyclic aromatic hydrocarbons is shown in Table 6.

TABLE 5

| | Feedstock Properties | | | Analysis method |
|---|---|---|---|---|
| Density @ 15° C. | | g/cm$^3$ | 0.9258 | JIS K 2249 |
| Kinematic viscosity @ 30° C. | | mm$^2$/s | 2.817 | JIS K 2283 |
| Distillation properties | Initial boiling point | ° C. | 173 | JIS K 2254 |
| | 10 volume % distillation temperature | ° C. | 215 | |
| | 50 volume % distillation temperature | ° C. | 266 | |
| | 90 volume % distillation temperature | ° C. | 318 | |
| | End point | ° C. | 346 | |
| Composition analysis | Saturated fraction | volume % | 22.9 | JPI-5S-49 |
| | Olefin fraction | volume % | 2.1 | |
| | Total aromatic fraction | volume % | 75 | |
| | Monocyclic aromatic fraction | volume % | 27.6 | |
| | Bicyclic aromatic fraction | volume % | 39.5 | |
| | Tricyclic or higher aromatic fraction | volume % | 7.9 | |

TABLE 6

| | Reaction format | Monocyclic aromatic hydrocarbons (% by mass) |
|---|---|---|
| Example 4 | Fluidized bed | 38 |
| Example 5 | Fluidized bed | 36 |
| Example 6 | Fluidized bed | 37 |
| Example 7 | Fluidized bed | 41 |

The results of Examples 1 to 6 confirmed that by hydrogenating the heavy fraction produced in the cracking and reforming reaction step, and then using the thus obtained hydrogenation reaction product as a feedstock for the cracking and reforming reaction step, monocyclic aromatic hydrocarbons could be produced. Moreover, the result of Example 7 confirmed that monocyclic aromatic hydrocarbons could also be produced by mixing a feedstock oil with the heavy fraction obtained upon treating the feedstock oil in a hydrogenation reaction step and a cracking and reforming reaction step, and then using the resulting mixed oil as a feedstock for performing a hydrogenation reaction step, followed by a cracking and reforming reaction step on the resulting hydrogenation reaction product. In contrast, in Comparative Examples 1 and 2, when the heavy fraction was not subjected to hydrogenation, but was rather used with no further modification as the feedstock for producing monocyclic aromatic hydrocarbons, only a very small amount of monocyclic aromatic hydrocarbons was obtained.

Based on these results, it is assumed that by mixing a hydrogenated product of the heavy fraction with the feedstock oil, and then returning the mixed oil to the cracking and reforming reaction step, the rate of production of by-products other than the monocyclic aromatic hydrocarbons can be reduced, and the amount of monocyclic aromatic hydrocarbons produced can be increased. Accordingly, by returning a hydrogenation reaction product of the heavy fraction to the cracking and reforming reaction step, the yield of monocyclic aromatic hydrocarbons can be improved.

INDUSTRIAL APPLICABILITY

The method for producing monocyclic aromatic hydrocarbons according to the present invention enables the yield of monocyclic aromatic hydrocarbons obtained from a feedstock oil having a 10 volume % distillation temperature of at least 140° C. and a 90 volume % distillation temperature of not more than 380° C. to be improved.

The invention claimed is:

1. A method for producing monocyclic aromatic hydrocarbons of 6 to 8 carbon number from a feedstock oil having a 10 volume % distillation temperature of at least 140° C. and a 90 volume % distillation temperature of not more than 380° C., the method comprising:
   a cracking and reforming reaction step of bringing the feedstock oil into contact with a monocyclic aromatic hydrocarbon production catalyst comprising a crystalline aluminosilicate, and reacting the feedstock oil to obtain a product comprising monocyclic aromatic hydrocarbons of 6 to 8 carbon number,
   a refining and collection step of refining and collecting monocyclic aromatic hydrocarbons of 6 to 8 carbon number that have been separated from the product obtained in the cracking and reforming reaction step,
   a hydrogenation reaction step of hydrogenating a heavy fraction of 9 or more carbon number separated from the product obtained in the cracking and reforming reaction step, and
   a recycling step of returning a heavy fraction hydrogenation reaction product obtained in the hydrogenation reaction step to the cracking and reforming reaction step.

2. The method for producing monocyclic aromatic hydrocarbons of 6 to 8 carbon number according to claim 1, further comprising a feedstock oil mixing step of mixing a portion of the feedstock oil with the heavy fraction of 9 or more carbon number separated from the product obtained in the cracking and reforming reaction step.

3. The method for producing monocyclic aromatic hydrocarbons of 6 to 8 carbon number according to claim 1, wherein the crystalline aluminosilicate contained within the monocyclic aromatic hydrocarbon production catalyst used in the cracking and reforming reaction step comprises a medium pore size zeolite and/or a large pore size zeolite as a main component.

4. The method for producing monocyclic aromatic hydrocarbons of 6 to 8 carbon number according to claim 1, further comprising a hydrogen recovery step of recovering, from the product obtained in the cracking and reforming reaction step, hydrogen that is produced as a byproduct in the cracking and reforming reaction step, and a hydrogen supply step of supplying the hydrogen recovered in the hydrogen recovery step to the hydrogenation reaction step.

5. A method for producing monocyclic aromatic hydrocarbons of 6 to 8 carbon number from a feedstock oil having a 10 volume % distillation temperature of at least 140° C. and a 90 volume % distillation temperature of not more than 380° C., the method comprising:
   a cracking and reforming reaction step of bringing the feedstock oil into contact with a monocyclic aromatic hydrocarbon production catalyst comprising a crystalline aluminosilicate, and reacting the feedstock oil to obtain a product comprising monocyclic aromatic hydrocarbons of 6 to 8 carbon number,
   a hydrogenation reaction step of hydrogenating a portion of the product obtained in the cracking and reforming reaction step,
   a refining and collection step of refining and collecting monocyclic aromatic hydrocarbons of 6 to 8 carbon number by distilling a hydrogenation reaction product obtained in the hydrogenation reaction step, and
   a recycling step of returning a heavy fraction of 9 or more carbon number, which has been separated and removed from the monocyclic aromatic hydrocarbons of 6 to 8 carbon number in the refining and collection step, to the cracking and reforming reaction step.

6. The method for producing monocyclic aromatic hydrocarbons of 6 to 8 carbon number according to claim 5, further comprising a feedstock oil mixing step of mixing a portion of the feedstock oil with a portion of the product obtained in the cracking and reforming reaction step.

7. The method for producing monocyclic aromatic hydrocarbons of 6 to 8 carbon number according to claim 5, wherein the crystalline aluminosilicate contained within the monocyclic aromatic hydrocarbon production catalyst used in the cracking and reforming reaction step comprises a medium pore size zeolite and/or a large pore size zeolite as a main component.

8. The method for producing monocyclic aromatic hydrocarbons of 6 to 8 carbon number according to claim 5, further comprising a hydrogen recovery step of recovering, from the product obtained in the cracking and reforming reaction step, hydrogen that is produced as a byproduct in the cracking and reforming reaction step, and a hydrogen supply step of supplying the hydrogen recovered in the hydrogen recovery step to the hydrogenation reaction step.

9. A method for producing monocyclic aromatic hydrocarbons of 6 to 8 carbon number from a feedstock oil having a 10 volume % distillation temperature of at least 140° C. and a 90 volume % distillation temperature of not more than 380° C., the method comprising:
   a hydrogenation reaction step of hydrogenating the feedstock oil,
   a cracking and reforming reaction step of bringing a hydrogenated product obtained in the hydrogenation reaction step into contact with a monocyclic aromatic hydrocarbon production catalyst comprising a crystalline aluminosilicate, and reacting the hydrogenated product to obtain a product comprising monocyclic aromatic hydrocarbons of 6 to 8 carbon number,
   a refining and collection step of refining and collecting monocyclic aromatic hydrocarbons of 6 to 8 carbon number that have been separated from the product obtained in the cracking and reforming reaction step, and
   a recycling step of returning a heavy fraction of 9 or more carbon number separated from the product obtained in the cracking and reforming reaction step to the hydrogenation reaction step.

10. The method for producing monocyclic aromatic hydrocarbons of 6 to 8 carbon number according to claim 9, wherein the crystalline aluminosilicate contained within the monocyclic aromatic hydrocarbon production catalyst used in the cracking and reforming reaction step comprises a medium pore size zeolite and/or a large pore size zeolite as a main component.

11. The method for producing monocyclic aromatic hydrocarbons of 6 to 8 carbon number according to claim 9, further comprising a hydrogen recovery step of recovering, from the product obtained in the cracking and reforming reaction step, hydrogen that is produced as a byproduct in the cracking and reforming reaction step, and a hydrogen supply step of supplying the hydrogen recovered in the hydrogen recovery step to the hydrogenation reaction step.

* * * * *